April 26, 1960 W. A. FLETCHER ET AL 2,934,200
CONVEYOR SYSTEM
Filed Oct. 15, 1956 3 Sheets-Sheet 3

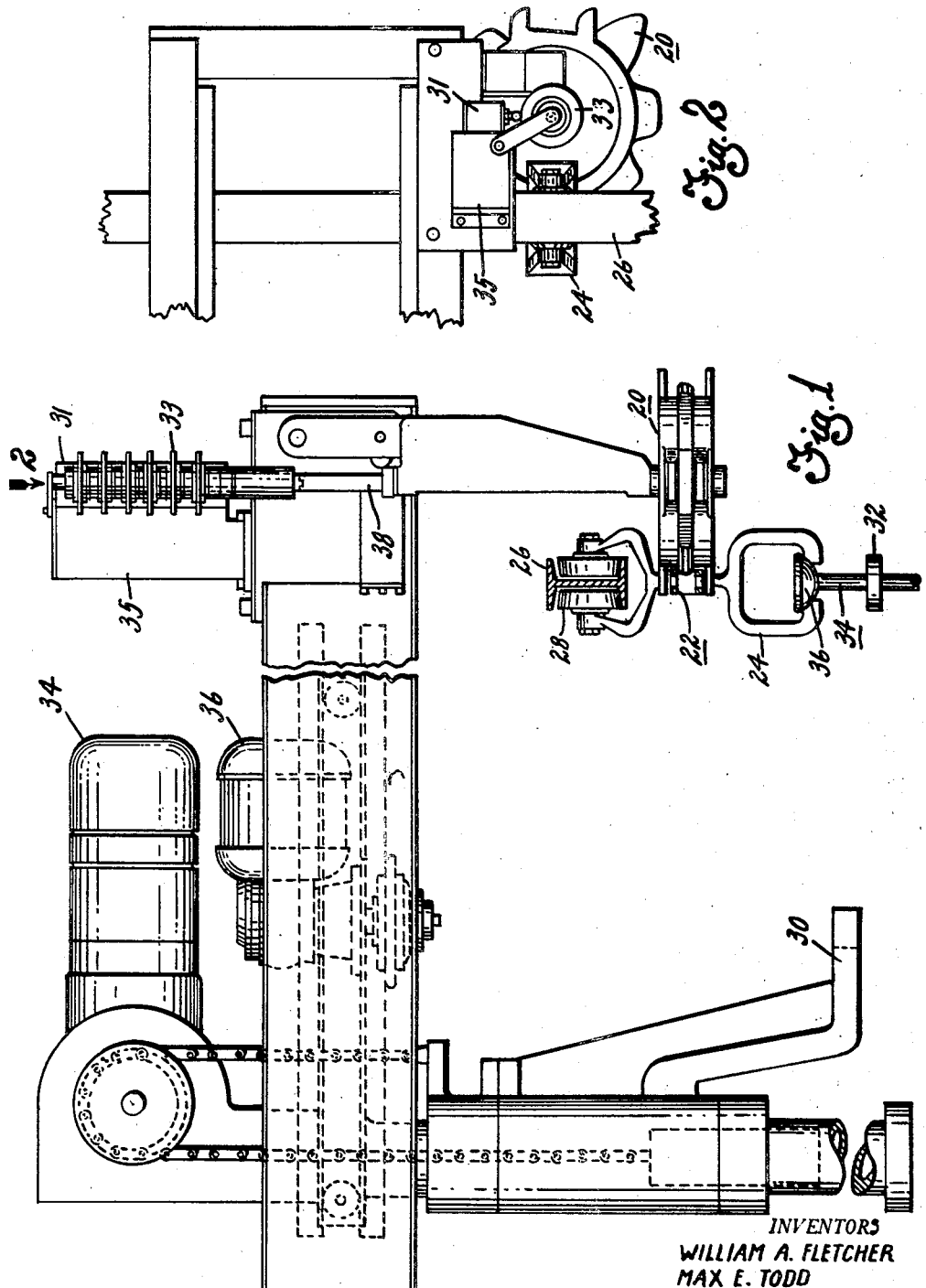

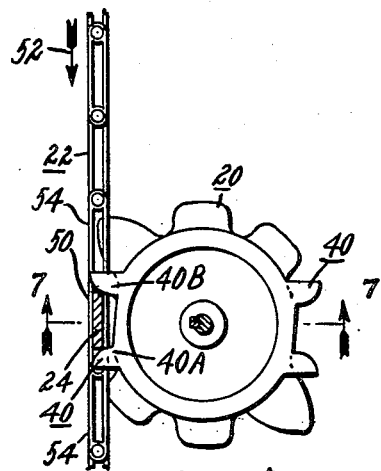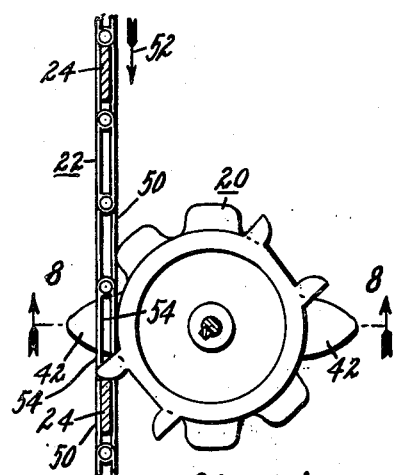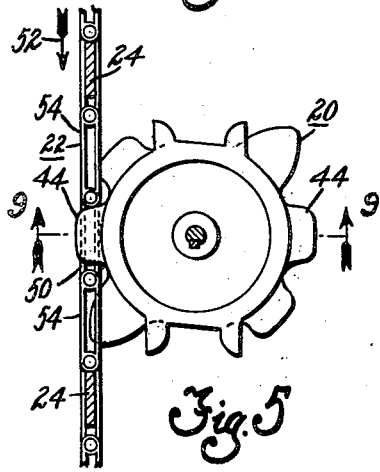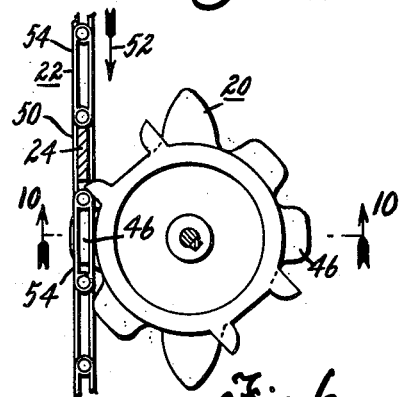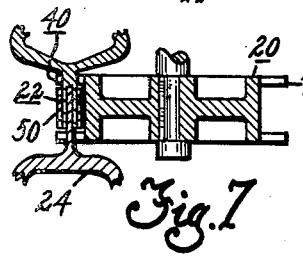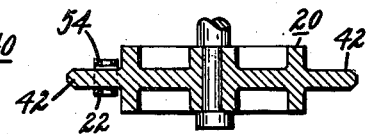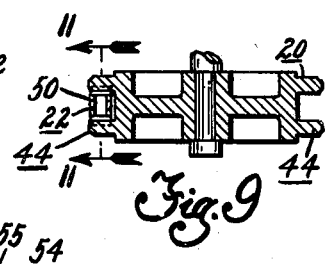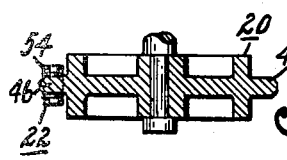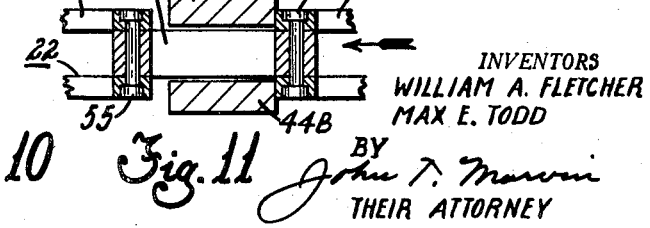

INVENTORS
WILLIAM A. FLETCHER
MAX E. TODD
BY
THEIR ATTORNEY

United States Patent Office 2,934,200
Patented Apr. 26, 1960

2,934,200
CONVEYOR SYSTEM

William A. Fletcher, Grand Rapids, Mich., and Max E. Todd, Anderson, Ind., assignors to General Motors Corporation, Detroit, Mich., a corporation of Delaware Application October 15, 1956, Serial No. 615,969

7 Claims. (Cl. 198—203)

This invention relates to conveyor apparatus and control systems therefor and more particularly to a sprocket which controls the actuation of a transfer mechanism for conveyor systems.

The present invention is directed to the control of the transfer mechanisms for conveyor systems and is particularly directed to a sprocket which can be used to control the actuation of the transfer mechanism of the type disclosed in application Serial Number 557,929, filed January 9, 1956, which has been assigned by the inventors to the assignee of the present invention.

The sprocket or pulley according to the present invention is particularly suited to be used with conveyors of the monorail type along which the part hangers are continuously moved. These parts hangers are preferably suspended in rolling engagement on the monorail and are spaced along an endless linked chain which is driven and moves the hangers along the monorail in a predetermined closed path.

The sprocket or pulley according to the present invention is adapted to be driven by or drive the conveyor chain so as to coordinate the movement of a transfer apparatus with the movement of the conveyor chain. It is to be appreciated that the movement of parts by a transfer mechanism to or from a moving conveyor must be properly timed if the transfer of the parts is to be accomplished without mishap. Further in the conveyor system described in the application supra, the conveyor chain is suspended by rolls from the monorail. This arrangement will permit slack in the conveyor chain to occur at indiscriminate points along the conveyor. Thus, if the transfer of parts to or from the conveyor is to be positive, the effect of this slack must be eliminated.

It is an object therefore of the present invention to provide an idler sprocket or pulley which will index a transfer mechanism in response to the movement of a conveyor chain.

It is a further object of the present invention to provide a sprocket or pulley which is in driving engagement with a conveyor chain that has parts hangers positioned at spaced points therealong.

Another object of the present invention is to provide a sprocket which will straddle some of the links of a conveyor chain and will project into openings provided by the remaining links of a conveyor chain.

A still further object of the present invention is to drive an indexing means for a transfer mechanism in a chain conveyor system with a sprocket which will embrace the parts hangers and certain of the links of the chain conveyor while it will project through openings by the remaining links of the conveyor chain.

A further object of the present invention is to provide an idler sprocket which will straddle or embrace the parts hangers which are spaced along a conveyor chain and will embrace certain of the links of the conveyor and project through the remaining links of the conveyor chain so the sprocket will be continuously rotated in response to the continuous longitudinal movement of the chain.

In the drawings:

Figure 1 is a side view of the transfer mechanism which is actuated by the pulley or sprocket according to the present invention.

Figure 2 is a top view of a portion of the apparatus shown in Figure 1 taken in the direction of arrow 2 in Figure 1.

Figures 3, 4, 5, and 6 are plan views showing the sprocket according to the present invention in various positions relative to a conveyor chain.

Figures 7, 8, 9, and 10 are sectional views taken along lines 7—7, 8—8, 9—9, and 10—10 in Figures 3, 4, 5, and 6 respectively.

Figure 11 is a sectional view taken along line 11—11 in Figure 9.

Figure 12:
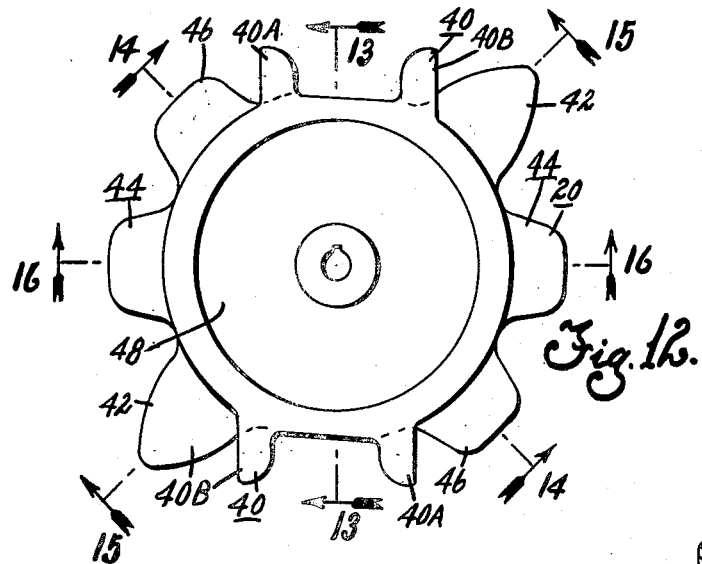

Figure 12 is an enlarged plan view of the sprocket according to the present invention.

Figures 13, 14, 15, and 16 are sectional views along lines 13—13, 14—14, 15—15, and 16—16 respectively in Figure 12.

Figure 17:
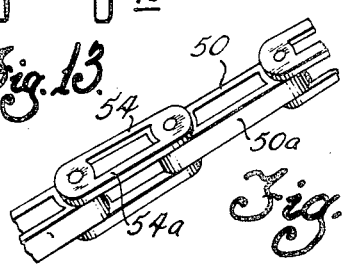

Figure 17 is a perspective view of the conveyor chain of this invention.

In the drawings in Figure 1 particularly, a transfer mechanism for a conveyor system as described in the application supra is shown. This transfer mechanism is actuated and turned by the sprocket or pulley 20. In this embodiment the sprocket 20 is suitably driven by the conveyor chain 22 which has parts hangers 24 spaced therealong. These parts hangers 24 are suspended from the monorail 26 of the conveyor system by means of rolls 28. The monorail 26 is in turn supported by means not shown so that the parts hangers 24 will vertically depend therefrom. The conveyor chain 22 is driven by a suitable means not shown at some remote point at a constant rate of speed so that the parts hangers 24 may continuously move along the monorail 26. The chain 22 is of a conventional type. The chain as clearly shown in Figures 11 and 17 comprises links 54 having vertically disposed sidewalls 54a which are connected to links 50 having horizontally disposed sidewalls 50a by means of pins 55 so the links 50 and 54 are movable relative to each other. It will be apparent from an inspection of Figures 11 and 17 that the sidewalls 54a and 50a of links 54 and 50 are disposed at right angles to one another and thus the links proper are also so disposed. It is also to be observed that the links 50 are of less width than the width of links 54. The transfer mechanism shown in Figure 1 is located at some predetermined point along the conveyor and arranged so the transfer arm 30 will have a reciprocable vertical and horizontal movement. In accomplishing the removal of part trees from the conveyor the hanger 24 moves horizontally from left to right in Figure 1 to a position where it intersects the path of travel of the part trees at the proper instant to engage the lug 32 on the part trees 34. The hanger 30 then moves vertically and raises the part tree 34 by engaging lug 32. This will cause the ball 36 to become unseated in the socket in the parts hanger 24. The continued movement of the conveyor chain 22 will move the parts hanger 24 out of position so the transfer arm 30 may move horizontally to the left where it can be lowered and present the part trees 34 either to a work station or to another moving conveyor.

The means for causing the sequential operation of the hanger 24 is accomplished by a plurality of cam discs 33. These cam discs are suitably connected through shaft 38 with the sprocket 20 so the discs 33 will rotate in response to the rotation of the sprocket 20. The discs 33 preferably are arranged to open and close micro switches 31 carried by the support 35. The micro switches 31 are arranged in proper circuits to control the actuation of the electric motors 34 and 36 which cause the reciprocable vertical and horizontal movement of the hanger arm 30 as described in the application supra.

Figure 13:
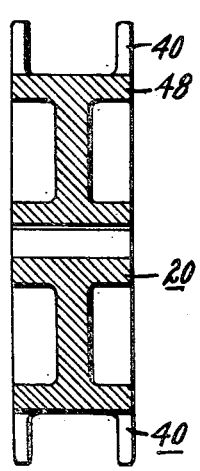
Figure 14:
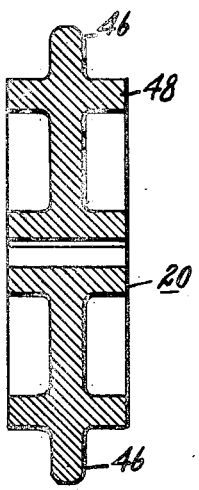
Figure 15:
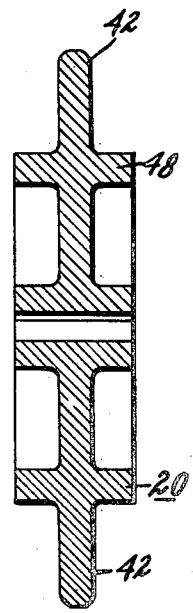
Figure 16:
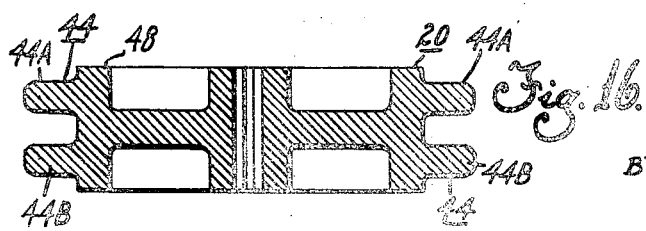

The sprocket gear 20 which is connected by means of shaft 38 to micro switches 31 has a plurality of differently shaped teeth or means on its outer periphery. This sprocket gear is used with a conveyor chain 22 which has the parts hangers 24 extending through the openings provided by the horizontally disposed links at predetermined spaced intervals along the conveyor chain. As shown in Figures 3, 7, and 13 the sprocket 20 has a means 40 for straddling or embracing the parts hanger 24. The sprocket 20 also has a means 42 as shown in Figures 4, 8, and 15 which are arranged to project completely through the openings provided by the vertically disposed links 54 of the conveyor chain 22. The sprocket 20 also is provided with a means 44 as shown in Figures 5, 9, and 16 which will straddle the horizontal links 50 of the conveyor chain 22. Included also on the periphery of the sprocket 20 are means 46 shown in Figures 6, 10 and 14 which will project only partially through the vertically disposed links 54.

In Figures 12 and 13 the arrangement of means 40 on the periphery of sprocket 20 is most clearly shown. The means 40 comprise teeth 40A and 40B which are circumferentially spaced on periphery of the sprocket discs 48, to straddle the parts hanger as shown in Figures 3 and 7. The teeth 40A and 40B each have a mid-portion removed to provide four teeth which are arranged to simultaneously straddle the parts hanger 24 and the horizontally disposed link 50 through which the parts hanger extends. In Figures 3, 4, 5, and 6 the conveyor chain 22 is shown as traveling in direction of arrows 52 so the idler sprocket 20 will be rotated from the position shown in Figure 3 wherein the means 40 on the sprocket 20 is straddling the parts hanger 24 to the position shown in Figure 4 wherein the means which consists of a tooth 42 is shown as projecting through an opening provided in a vertically disposed link 54. The means or tooth 42 which projects through the openings in the link 54 is most clearly shown in Figures 12 and 15. At this point it is to be noted that the tooth 42 is located on the center line of the sprocket whereas the teeth which form the means and which straddle the link 50 and the parts hangers 24 are located along the top and bottom surfaces of the disc 48.

After the sprocket 20 has been moved to the position shown in Figure 4 the continued movement of the chain 22 will cause the sprocket to rotate to the position shown in Figure 5. When the chain 22 and the sprocket 20 are in this position, the means 44 which consist of a pair of teeth 44A and 44B which are located as shown along the top and bottom surfaces of the disc 48 will straddle a horizontal link 50 of the conveyor chain as shown in Figure 11. The means 44 are clearly shown in Figures 12 and 16. From this point the continued movement of the chain 22 will cause the sprocket 20 to be rotated to the position shown in Figure 6. When the sprocket is in this position teeth 46 shown in Figures 12 and 14 are moved into the position where they will project partly through the vertical link 54 as shown in Figures 6 and 10. At this point it is to be noted that the function of teeth or means 46 is similar to that accomplished by the teeth or means 42 that is both of the teeth project through the openings presented by the vertical links 54. It has been found, however, that if the teeth 42 are sized so that they will extend completely through the links 54 the sprocket will be more positively driven. These teeth, of course, are arranged so that they immediately follow the means 40 which straddle the parts hangers. On the other hand, it has been found unnecessary to extend the teeth 46 to the degree of extension of teeth 42. In the embodiment in Figure 12 the means 40, 42, 44, and 46 are shown in duplicate on opposite sides of the disc 48. The disposition of means 40 in the periphery of disc 48 will be dictated by the spacing of the parts hangers 24 along the conveyor chain 22. The means 40, of course, will always be preceded and succeeded by means 46 and 42 respectively and the means 44 will always be disposed between either of means 46 and 42. When the above arrangement is employed the alternate links 50 will be straddled by either of the means 40 or 44 on the sprocket 20 while the remaining means 42 and 46 will project through the openings presented by the links 54 of the conveyor chain. Thus each of the means 40, 42, 44, and 46 will provide a driving connection between the chain and discs 33 to eliminate all effects of chain slack and affect the precise timing of the transfer mechanism relative to the parts hangers on the conveyor chain.

What is claimed is as follows:

1. In a conveyor system, the combination comprising; a monorail trackway, a movable chain having alternate links with side walls of alternate links being disposed at right angles to each other, said chain being spaced from said trackway, a plurality of part hangers carried by said trackway, said part hangers being spaced apart and having portions passing through spaced links of said chain, and a control sprocket, said sprocket having first and second teeth extending from its periphery spaced circumferentially to engage opposite sides of said part hanger portions and alternate links of said chain.

2. In a conveyor system, the combination comprising; a movable chain, a plurality of part hangers spaced along the length of said chain and having portions extending through spaced links of said chain, means for supporting said part hangers for movement with said chain, a control sprocket, said sprocket having; first teeth thereon embracing spaced links of said chain, second teeth projecting through openings in other links of said chain and third teeth embracing a portion of said hangers, whereby the longitudinal movement of said chain and hangers produces a rotary movement of said sprocket.

3. In a conveyor system, the combination comprising: a movable conveyor chain having first and second links oriented at right angles to each other, said first links being narrower in width than said second links, a plurality of part hangers spaced along the length of said chain and having portions engaging said chain, means for supporting said part hangers for movement with said chain, and a control sprocket, said sprocket having first teeth peripherally disposed thereon straddling said first links and engaging the said second links, and second teeth peripherally disposed on said sprocket projecting into said second links whereby said sprocket is driven by both said first and said second links when said chain is moved.

4. In a conveyor system, the combination comprising; a movable chain, a plurality of part hangers spaced along the length of said chain and having portions engaging spaced links of said chain, means for supporting said part hangers for movement with said chain, and a control sprocket, said control sprocket having first teeth embracing said portion of said part hangers and having second teeth projecting through spaced links only of said conveyor chain, said sprocket having third teeth straddling certain other links of said conveyor chain for engagement with adjacent links, all of said teeth being located on the periphery of said sprocket.

5. In a conveyor system, the combination comprising; a movable chain, a plurality of part hangers spaced along the length of said chain and having portions engaging spaced links of said chain, means for supporting said part hangers for movement with said chain, and a control sprocket, said control sprocket including first tooth means straddling a portion of a part hanger, second tooth means on said sprocket projecting through openings in certain links of said chain, and third tooth means on said sprocket straddling the remainder of the links of said chain, all of said tooth means being located and arranged in a predetermined sequence on the periphery of said sprocket.

6. In a conveyor system, the combination comprising; a movable chain, a plurality of part hangers spaced along the length of said chain and having portions extending through spaced links of said chain, means for supporting said part hangers for movement with said chain, and a control sprocket, said sprocket having; first teeth arranged to straddle said hangers, second teeth arranged to project through openings presented by certain links only of said chain and third teeth straddling the remaining links of said chain with all of said teeth being located in a predetermined sequence on the periphery of said sprocket.

7. In a conveyor system, the combination comprising; a movable chain having alternate links of different widths, a plurality of part hangers extending through certain of said links of said chain at spaced intervals along the length of said chain, means for supporting said part hangers for movement with said chain, and a sprocket journalled for rotation and driven by said chain, said sprocket having; means extending on opposite sides of said part hangers for engagement therewith, means for straddling said links of smaller width, and means projecting through openings in the links of greater width, all of said means being located on the periphery of said sprocket and arranged in a predetermined sequence thereon.

References Cited in the file of this patent
UNITED STATES PATENTS

| | | |
|---|---|---|
| 358,258 | Dodge | Feb. 22, 1887 |
| 1,500,776 | Spooner | July 8, 1924 |
| 2,349,578 | Ellen | May 23, 1944 |
| 2,768,733 | Wilson | Oct. 30, 1956 |
| 2,830,694 | Zebarth | Apr. 15, 1958 |

FOREIGN PATENTS

| | | |
|---|---|---|
| 487,188 | Great Britain | June 16, 1938 |
| 675,015 | France | Oct. 28, 1929 |